US010093850B2

(12) United States Patent
Prakash et al.

(10) Patent No.: US 10,093,850 B2
(45) Date of Patent: Oct. 9, 2018

(54) ACTIVATOR FOR BREAKING SYSTEM IN HIGH-TEMPERATURE FRACTURING FLUIDS

(71) Applicant: Halliburton Energy Services, Inc., Houston, TX (US)

(72) Inventors: Chetan Prakash, Pune (IN); Ravikant Belakshe, Pune (IN); Nurpasha Hipparge, Dist-Osmanabad (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/565,879

(22) PCT Filed: May 11, 2015

(86) PCT No.: PCT/US2015/030098
§ 371 (c)(1),
(2) Date: Oct. 11, 2017

(87) PCT Pub. No.: WO2016/182553
PCT Pub. Date: Nov. 17, 2016

(65) Prior Publication Data
US 2018/0105737 A1 Apr. 19, 2018

(51) Int. Cl.
*E21B 43/22* (2006.01)
*C09K 8/88* (2006.01)
(Continued)

(52) U.S. Cl.
CPC ............... *C09K 8/887* (2013.01); *C09K 8/12* (2013.01); *C09K 8/40* (2013.01); *C09K 8/44* (2013.01);
(Continued)

(58) Field of Classification Search
CPC ...... C09K 8/68; C09K 8/685; C09K 2208/26; E21B 43/26; E21B 43/267; E21B 33/13; E21B 37/06; E21B 43/04
See application file for complete search history.

(56) References Cited

U.S. PATENT DOCUMENTS 4,537,688 A 8/1985 Peiffer et al.
5,950,731 A 9/1999 Shuchart et al.
(Continued)

OTHER PUBLICATIONS

Holtsclaw, Jeremy, and Gary P. Funkhouser. "A crosslinkable synthetic-polymer system for high-temperature hydraulic-fracturing applications." SPE Drilling & Completion 25.04 (2010): 555-563.
(Continued)

*Primary Examiner* — Zakiya W Bates
(74) *Attorney, Agent, or Firm* — McGuireWoods LLP

(57) ABSTRACT

A wellbore treatment fluid comprising: a base fluid; a viscosifier, wherein the viscosifier is a synthetic, cross-linked polymer having a thermal stability greater than 275° F.; a breaker, wherein the breaker decreases the viscosity of the treatment fluid at or above a breaker-activation temperature; and an activator, wherein the activator is a chelate complex, and wherein the activator activates the breaker to reduce the viscosity of the treatment fluid at a temperature less than the breaker-activation temperature. A method of treating a subterranean formation comprising: introducing the treatment fluid into the subterranean formation.

21 Claims, 4 Drawing Sheets

(51) Int. Cl.
*C09K 8/12* (2006.01)
*C09K 8/44* (2006.01)
*E21B 43/267* (2006.01)
*C09K 8/40* (2006.01)
*E21B 21/00* (2006.01)

(52) U.S. Cl.
CPC ............ C09K 8/882 (2013.01); E21B 43/267 (2013.01); *C09K 2208/26* (2013.01); *E21B 21/00* (2013.01)

(56) References Cited

U.S. PATENT DOCUMENTS

| | | |
|---|---|---|
| 6,986,391 B2 | 1/2006 | Funkhouser et al. |
| 2009/0082228 A1 | 3/2009 | Parris et al. |
| 2013/0324443 A1 | 12/2013 | Wang et al. |
| 2014/0196897 A1 | 7/2014 | Lin et al. |
| 2014/0342952 A1 | 11/2014 | Suryawanshi et al. |
| 2015/0047849 A1* | 2/2015 | Wicker, Jr. ............... C09K 8/80 166/308.2 |

OTHER PUBLICATIONS

International Search Report and Written Opinion dated Sep. 30, 2015, International PCT Application No. PCT/US2015/030098.

\* cited by examiner

US 10,093,850 B2

ACTIVATOR FOR BREAKING SYSTEM IN HIGH-TEMPERATURE FRACTURING FLUIDS

TECHNICAL FIELD

Treatment fluids can be used in a variety of oil and gas operations. A treatment fluid can include a viscosifier for increasing the viscosity of the treatment fluid. A breaker can also be used to break or reduce the viscosity of the treatment fluid after introduction into a well. The breaker can be activated by an activator, thereby allowing the breaker to break the viscosity of the fluid.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
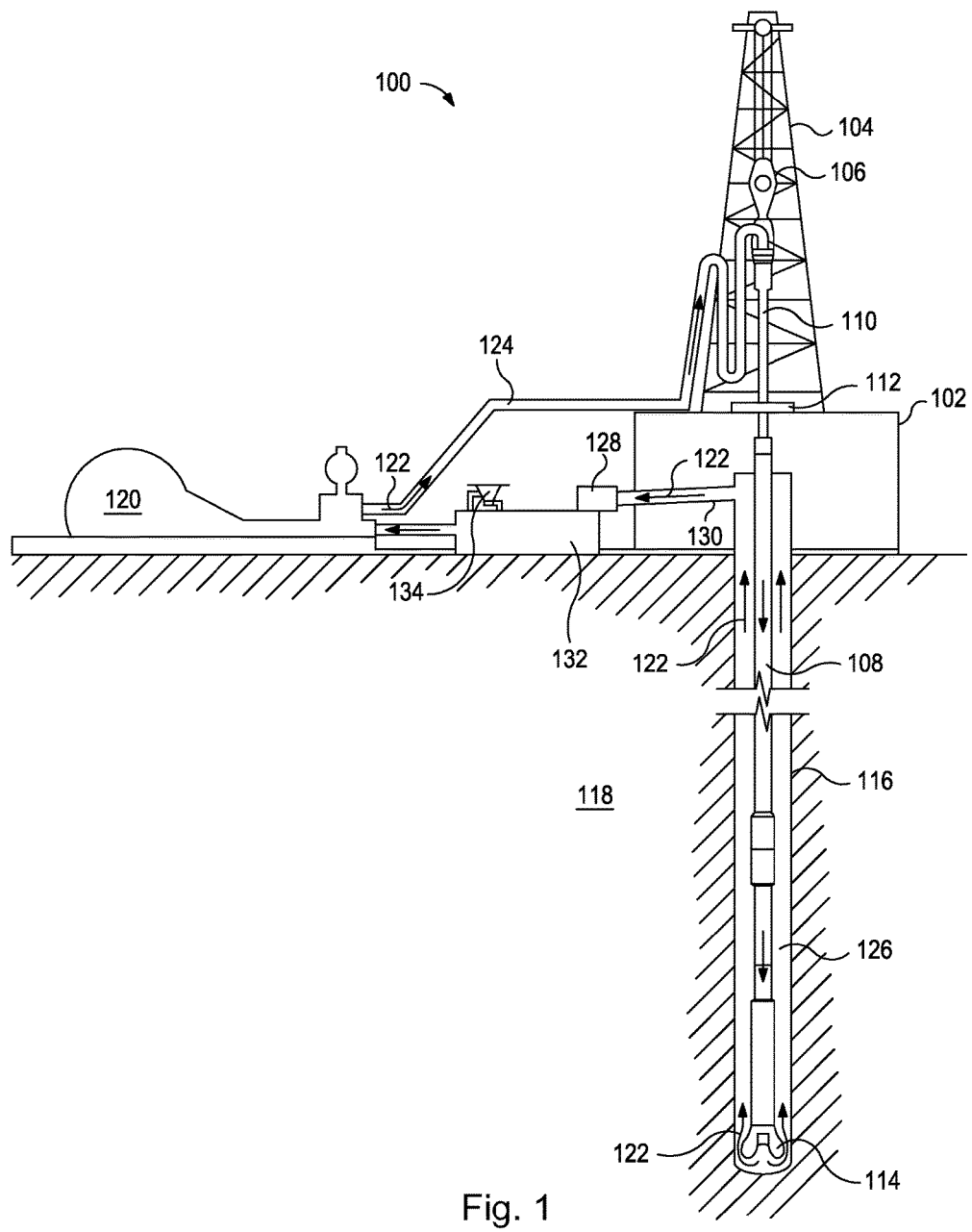
FIG. 1 illustrates a system for preparation and delivery of a treatment fluid to a wellbore according to certain embodiments.

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere (atm) (0.1 megapascals (MPa)). A fluid can be a liquid or gas. A homogenous fluid has only one phase, whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. As used herein, the term "base fluid" means the solvent of a solution or the continuous phase of a heterogeneous fluid. As used herein, the phrase "aqueous-based" means a solution wherein an aqueous liquid is the solvent or a heterogeneous fluid wherein an aqueous liquid makes up the continuous phase.

A well can include, without limitation, an oil, gas, or water production well, an injection well, or a geothermal well, or a high-temperature, high-pressure (HTHP) well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation, including into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, cement compositions, completion fluids, stimulation fluids (e.g., fracturing fluids), and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

It is often desirable to increase the viscosity of a treatment fluid by the addition of a viscosifier (also referred to as a suspending agent or gellant). The increase in viscosity can be used to suspend solid particles, including drill cuttings, proppant, and insoluble additives, within the base fluid of the treatment fluid. Common viscosifiers are polymers or cross-linked polymer molecules. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

In a copolymer, the repeating units from each of the monomer residues can be arranged in various manners along the polymer chain. For example, the repeating units can be random, alternating, periodic, or block. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules. A second polymer can also be grafted onto the backbone of a first polymer.

The viscosifier is generally selected based on the thermal stability of the viscosifier and the anticipated wellbore temperature in which the viscosifier will be used. For example, synthetic-based polymeric viscosifiers are commonly used when the anticipated wellbore temperature is greater than about 275° F. (135° C.), whereas borate-guar/hydroxypropyl guar cross-linked viscosifiers can be used at temperatures less than about 320° F. (160° C.) and zirconium-carboxymethylhydroxypropyl guar cross-linked viscosifiers can be used at temperatures less than about 375° F. (191° C.).

It may also be desirable to "break" or reduce the viscosity of the treatment fluid at a later time after introduction into the well. The breaking of the fluid may be necessary to remove the fluid or flow the fluid from the wellbore. Therefore, a viscosified treatment fluid can include a breaker for breaking the viscosity of the fluid. Breakers are generally selected based on the type of viscosifier used in the treatment fluid. By way of example, chlorites are commonly used to break the viscosity of a fluid containing a guar-based viscosifier. A breaker can break the viscosity of a fluid by the release of atoms or functional groups (e.g., oxygen), which can be used to oxidize various components of a polymeric viscosifier such as the cross links of the polymer molecules or the backbone of the polymer. This oxidation reduces the size of the polymer molecules or cross-linked polymer network, which in turn, reduces the viscosity of the treatment fluid.

A breaker has a particular activation temperature at which the breaker is capable of oxidizing a viscosifier. If the fluid is used in a wellbore with temperatures below the activation temperature of the breaker, then the breaker will either not break the viscosity of the fluid or the time it takes to break the viscosity is too long. However, because the breaker is generally dependent on the type of viscosifier used and the viscosifier is dependent on the wellbore temperature makes the available options for breakers rather limited. Thus, there is a need and ongoing industry-wide interest in new activators for activating a breaker when the wellbore temperatures are less than the activation temperature of the breaker. It has been discovered that a chelate complex or coordination complex can be used to activate a breaker when the viscosifier is a synthetic polymer having a high thermal stability.

A chelate complex exists when a single metal ion forms coordinate bonds with a polydentate ligand. A ligand is commonly called a chelant, chelating agent, or sequestering agent. A coordination complex exists when a single metal ion forms coordinate bonds with a monodentate ligand. The ligand sequesters and inactivates the central metal ion so the metal ion does not easily react with other elements or ions to produce precipitates or scale. A polydentate ligand is a molecule or compound in which at least two atoms of the ligand bond with the metal ion. A polydentate ligand can be, for example, bidentate (2 atoms bond), tridentate (3 atoms bond), tetradentate (4 atoms bond), pentadentate (5 atoms bond), and so on. A monodentate ligand is a molecule or compound in which only one atom of the ligand bonds with the metal ion. The ligand can also contain at least one functional group that is capable of forming a bond with the metal ion. Common functional groups include a carboxylate, an amine, an alcohol, an ether, an amino carboxylate, and glutamic acid diacetic acid.

It is to be understood that if any laboratory test (e.g., apparent viscosity) requires the test be performed at a specified temperature and possibly a specified pressure, then the temperature and pressure of the test composition is ramped up to the specified temperature and pressure after being mixed at ambient temperature and pressure. For example, the composition can be mixed at 71° F. (22° C.) and 1 atm (0.1 MPa) and then placed into the testing apparatus and the temperature of the composition can be ramped up to the specified temperature. As used herein, the rate of ramping up the temperature is in the range of about 3° F./min to about 5° F./min (about 1.67° C./min to about 2.78° C./min). After the composition is ramped up to the specified temperature and possibly specified pressure, the composition is maintained at that temperature and pressure for the duration of the testing.

If any laboratory test requires the composition to be mixed, then the composition is "mixed" according to the following procedure. The water is added to a mixing container and the container is then placed on a mixer base. The motor of the base is then turned on and maintained at 4,000 revolutions per minute (rpm). The dry and/or liquid ingredients are added to the container at a uniform rate in no more than a total of 15 seconds (s). After all the ingredients have been added to the water in the container, a cover is then placed on the container, and the composition is mixed at 12,000 rpm (+/−500 rpm) for 35 s (+/−1 s). It is to be understood that the composition is mixed at ambient temperature and pressure (about 71° F. (22° C.) and about 1 atm (0.1 MPa)).

As used herein, the "apparent viscosity" of a treatment fluid is measured as follows. The treatment fluid is mixed. The treatment fluid is placed into the test cell of a rotational viscometer, such as a CHANDLER® Model 5550 high-temperature, high-pressure viscometer fitted with a R1 rotor and B5X bob combination. The treatment fluid is tested at a constant shear rate of 40 $sec^{-1}$, the specified temperature, and ambient pressure (about 1 atm (0.1 MPa)).

According to certain embodiments, a wellbore treatment fluid comprises: a base fluid; a viscosifier, wherein the viscosifier is a synthetic, cross-linked polymer having a thermal stability greater than 275° F. (135° C.); a breaker, wherein the breaker decreases the viscosity of the treatment fluid at or above a breaker-activation temperature; and an activator, wherein the activator is a chelate complex, and wherein the activator activates the breaker to reduce the viscosity of the treatment fluid at a temperature less than the breaker-activation temperature.

According to certain other embodiments, a method of treating a subterranean formation comprising: introducing the treatment fluid into the subterranean formation.

The discussion of preferred embodiments regarding the treatment fluid or any ingredient in the fluids is intended to apply to all of the composition and method embodiments. Any reference to the unit "gallons" means U.S. gallons.

The treatment fluid includes a base fluid. The base fluid can include water. The water can be selected from the group consisting of fresh water, brackish water, sea water, brine, produced water—as it is or processed, and any combination thereof in any proportion. The treatment fluid can also include water-miscible liquids, hydrocarbon liquids, and gases. The base fluid can also include a water-soluble salt. The salt can be selected from the group consisting of sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The treatment fluid includes a viscosifier. The viscosifier is a synthetic, cross-linked polymer. According to certain embodiments, the polymer is a copolymer. The monomer residues can be selected from the group consisting of 2-acrylamido-2-methylpropane sulfonic acid (AMPS®), acrylamide, acrylic acid and salts thereof, N-[tris(hydroxymethyl)methyl]acrylamide, and combinations thereof. According to certain embodiments, the viscosifier is a terpolymer of AMPS®, acrylamide, and acrylic acid, wherein the polymer hydrates in the presence of water to form a gel that can be rapidly cross-linked by a cross-linking agent. The AMPS® can be present in the polymer in an amount in the range of from about 15 weight % to about 80 weight %. The acrylamide can be present in an amount in the range of from about 20 weight % to about 85 weight % and the acrylic acid or salts thereof can be present in an amount in the range of from about 0 weight % to about 10 weight %. The terpolymer can include 60 weight % of AMPS®, 39.5 weight % of acrylamide, and 0.5 weight % of acrylic acid or salts thereof.

The treatment fluid can further include a cross-linking agent for cross-linking the viscosifier polymer. The cross-linking agent can include a metal ion, such as titanium (IV); zirconium (IV) or hafnium (IV) ions, for example, titanium (IV) (triethanolaminato)isopropoxide, tetrakis(triethanolaminato) zirconium (IV), and hafnium (IV) acetylacetonate, and D-block metals of the periodic table. The cross-linking agent can be in a concentration in the range of about 0.02% to about 1% by weight of the base fluid. The cross-linking agent can also be in a sufficient concentration such that the polymer is cross-linked to provide a desired viscosity to the treatment fluid. The pH of the treatment fluid may need to be adjusted to allow the cross-linking agent to cross-link the polymer molecules. For example, the treatment fluid may need to be in a pH in the acidic range to facilitate cross linking.

The viscosifier can be in a concentration in the range of about 0.1% to about 5% by weight of base fluid. The viscosifier can also be in a sufficient concentration such that the treatment fluid has an apparent viscosity of at least 200 centipoise (cP) at a temperature of 300° F. (149° C.) and shear rate 40 l/sec prior to breaking. The viscosifier can also be in a sufficient concentration such that the treatment fluid has an apparent viscosity in the range of about 200 to about 5,0000 cP at a temperature of 300° F. (149° C.) and shear rate 40 l/sec prior to breaking.

The polymer has a thermal stability greater than 275° F. (135° C.). As used herein, the term "thermal stability," and all grammatical variations thereof, means that a significant portion of the polymer does not degrade or break down at a temperature less than or equal to the thermal stability temperature. As such the polymeric viscosifier can be used in higher temperature subterranean formations that have a bottomhole temperature less than or equal to the thermal stability temperature of the polymeric viscosifier. As used herein, the term "bottomhole" means the location within the wellbore or subterranean formation where the treatment fluid is located.

The treatment fluid also includes a breaker for breaking the viscosity of the treatment fluid. The breaker can decrease the viscosity of the treatment fluid at or above a breaker-activation temperature. The breaker can be a compound that oxidizes the viscosifier polymer. The oxidation can result in, for example, cleavage of cross-linking bonds, breaks along the backbone of the polymer, or fragmenting the polymer into smaller pieces. The breaker can be selected such that it reduces the viscosity of the treatment fluid depending on the specific viscosifier polymer used and the monomer residues used to make up the polymer. The breaker can be selected from the group consisting of sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, and combinations thereof.

The breaker can be in a concentration in the range of about 0.01% to about 10% by volume of the base fluid. The concentration of the breaker can depend on factors such as the desired injection period, the particular gelling agent and its concentration, and the bottomhole temperature of the formation, as well as other factors.

The treatment fluid also contains an activator. The activator is a chelate or coordination complex. As used herein, any reference to a "chelate complex" also includes a coordination complex without the need to continually refer to both types of complexes throughout. The activator can include a metal, metal oxide, or metal hydroxide. According to certain embodiments, the metal, metal oxide, or metal hydroxide of the activator is capable of forming a chelate complex with a ligand. According to certain embodiments, the metal, metal oxide, or metal hydroxide has at least one available charge for creating a bond with an available charge of the ligand. According to certain other embodiments, the metal, metal oxide, or metal hydroxide has two or more available charges for creating bonds with two or more available charges of the ligand. Examples of suitable metals include, but are not limited to, the metals found in Groups IA, IIA, the transition metals of the periodic table, semi-metals, and metalloids, and the oxides or hydroxides of the aforementioned metals. The metal oxide can also be a metal that reacts in the presence of water to form a metal hydroxide. Preferably, the metal is copper, zinc, iron, chromium, manganese, nickel, vanadium, or cobalt. The activator can also contain more than one metal, metal oxide, or metal hydroxide, wherein the two or more metals, metal oxides, or metal hydroxides are the same or different. By way of example, a first metal can be copper while a second metal can be cobalt. The source of ferrous ions can be selected from compounds such as iron (II) sulfate heptahydrate ($FeSO_4.7H_2O$), iron (II) chloride ($FeCl_2$), and iron (II) gluconate. Suitable transition metals can include those elements listed in Groups 3-12 of the periodic table. Suitable semi-metals include aluminum. Suitable metalloids include boron.

The activator also includes a ligand for forming the chelate complex. The ligand can have at least one available charge for bonding with the metal, metal oxide, or metal hydroxide. The ligand can be selected from the group consisting of ethylenediaminetetraacetic acid (EDTA); iminodiacetic acid (IDA); nitrilotriacetic acid (NTA); diethylene triamine pentaacetic acid (DTPA); ethylene glycol tetraacetic acid (EGTA); 1,2-bis(o-aminophenoxy)ethane-N,N,N',N'-tetraacetic acid (BAPTA); 1,4,7,10-tetraazacyclododecane-1,4,7,10-tetraacetic acid (DOTA); nicotianamine; any polyamino carboxylic acids; propylenediaminetetraacetic acid (PDTA); N-(2-hydroxyethyl)ethylenediaminetriacetic acid (HEDTA); hydroxyethyliminodiacetic acid (HEIDA); cyclohexylenediaminetetraacetic acid (CDTA); diphenylaminesulfonic acid (DPAS); ethylenediaminedi(o-hydroxyphenylacetic) acid (EDDHA); glucoheptonic acid; gluconic acid; citric acid, any salt thereof; glutamic acid diacetic acid (GLDA); methylglycine diacetic acid (MGDA); β-alanine diacetic acid (β-ADA); ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl]aspartic acid (BCA5); N-bis[2-(1,2-dicarboxyethoxy)ethyl]methylglycine (MCBA5); N-tris[(1,2-dicarboxyethoxy)ethyl]amine (TCA6); N-methyliminodiacetic acid (MIDA); N-(2-acetamido)iminodiacetic acid (ADA); hydroxymethyl-iminodiacetic acid, 2-(2-carboxyethylamino) succinic acid (CEAA); 2-(2-carboxymethylamino) succinic acid (CMAA); diethylenetriamine-N,N'''-disuccinic acid; triethylenetetramine-N,N''''-disuccinic acid; 1,6-hexamethylenediamine-N,N'-disuccinic acid; tetraethylenepentamine-N,N''''-disuccinic acid, 2-hydroxypropylene-1,3-diamine-N,N'-disuccinic acid; 1,2-propylenediamine-N,N'-disuccinic acid, 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; and combinations thereof. According to certain embodiments, the activator is copper (II) EDTA.

The activator activates the breaker to reduce the viscosity of the treatment fluid at a temperature less than the breaker-activation temperature. By way of example, if the treatment fluid is used in a wellbore having a bottomhole temperature that is less than the breaker-activation temperature, then the breaker would not become activated to break the viscosity. Therefore, the activator can lower the activation energy needed for the breaker to become activated and break the viscosity of the fluid. Accordingly, the treatment fluid can be used in subterranean formations having a variety of temperature ranges, including temperatures below the breaker-activation temperature.

The treatment fluid can also contain various other additives. The other additives can include, for example, silica scale control additives, surfactants, gel stabilizers, antioxidants, polymer degradation prevention additives, relative permeability modifiers, scale inhibitors, corrosion inhibitors, foaming agents, de-foaming agents, antifoaming agents, emulsifying agents, de-emulsifying agents, iron control agents, particulate diverters, salts, acids, fluid loss control additives, gases, catalysts, clay control agents, dispersants, flocculants, scavengers (e.g., $H_2S$ scavengers, $CO_2$ scavengers, or $O_2$ scavengers), lubricants, friction reducers, bridging agents, weighting agents, solubilizers, pH control agents (e.g., buffers), hydrate inhibitors, consolidating agents, bactericides, catalysts, and clay stabilizers.

The treatment fluid can be, without limitation, a drilling fluid, a drill-in fluid, a packer fluid, a completion fluid, a spacer fluid, a work-over fluid, an insulating fluid, or a stimulation fluid (e.g., a fracturing fluid). According to certain embodiments, the treatment fluid is a fracturing fluid. For fracturing operations, the fracturing fluid, often called a pad fluid, is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. As used herein, the term "fracture" means the creation or enhancement of a natural fracture using a fracturing fluid and can be referred to as "man-made."

The newly created or enhanced fracture will tend to close together after pumping of the fracturing fluid has stopped due to the weight of the subterranean formation. To prevent the fracture from closing, a material must be placed in the fracture to keep the fracture propped open. A material used for this purpose is often referred to as a "proppant." The proppant is in the form of solid particles, which can be suspended in the fracturing fluid, carried downhole, and deposited in the fracture as a "proppant pack." The proppant pack generally props the fracture in an open position while allowing fluid flow through the permeability of the pack.

The fracturing fluid can also include proppant. The proppant can be selected from the group consisting of nut shells, sand, ceramics, natural sand, quartz sand, particulate garnet, metal particulates, glass, nylon pellets, bauxite and other ores, polymeric materials, and combinations thereof in any proportion. The proppant can be substantially spherical in shape, fibrous materials, polygonal shaped (such as cubic), irregular shapes, and any combination thereof. The surface modification agent can be coated onto the proppant. Appropriate sizes of particulate for use as a proppant are typically in the range from about 8 to about 100 U.S. standard mesh. A typical proppant is sand-sized, which geologically is defined as having a largest dimension ranging from 0.0625 millimeters up to 3 millimeters.

The proppant can also be coated with a curable resin or tackifying agent. The curable resin or tackifying agent can help the proppant form a proppant pack within the fracture. The curable resin can be part of a curing resin system. The curable resin can be any compound that is capable of curing (i.e., the process of gaining compressive strength and becoming hard). The curable resin can cure via a chemical reaction with a curing agent or via temperature. The curable resin can coat the proppant prior to or during introduction of the fracturing fluid into the well. The curable resin can also chemically bond with the surfaces of the proppant. According to certain embodiments, the curable resin is an epoxy, diepoxy, polyepoxy resin, phenol-formaldehyde, or furan-based resin. For example, the curable resin can be bisphenol A glycidyldiepoxy, glycidyl propyltrimethoxysilane. The curable resin can be in a concentration in the range of about 0.1% to about 10% by weight of the resin system.

The methods include introducing the treatment fluid into the subterranean formation. The subterranean formation can have a bottomhole temperature in the range of about 75° F. to about 450° F. (about 24° C. to about 232° C.). According to certain embodiments, the subterranean formation has a bottomhole temperature that is less than the breaker-activation temperature. According to certain embodiments, the subterranean formation is penetrated by a well. The well can be, without limitation, an oil, gas, or water production well, an injection well, a geothermal well, or a high-temperature and high-pressure (HTHP) well.

The methods can further include creating or enhancing one or more fractures in the subterranean formation during the step of introducing, wherein the treatment fluid is a fracturing fluid.

The methods can further include causing or allowing the activator to activate the breaker, wherein the activation of the breaker reduces the viscosity of the treatment fluid. According to certain embodiments, the breaker does not break the viscosity of the treatment fluid for a desired period of time. The desired period of time can be in the range of about 30 minutes to about 48 hours. The breaker can reduce the viscosity of the treatment fluid to less than 500 cP in time greater than or equal to 150 minutes. The viscosity can be reduced to a viscosity such that the base fluid can be flowed from the well. The methods can further include flowing at least a portion of the broken treatment fluid from the subterranean formation.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, as well as other wellbore operations (e.g., completion, injection, workover, and stimulation) without departing from the scope of the disclosure.

The following discussion pertains to the use of the treatment fluid as a drilling fluid, but it should be understood that parts of the discussion can be equally applicable to other types of treatment fluids, such as completion fluids, stimulation fluids, etc. As illustrated, the wellbore assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments, however, the disclosed fluids can be added to the drilling fluid 122 at any other location in the drilling assembly 100. In at least one embodiment, for example, there could be more than one retention pit 132, such as multiple retention pits 132 in series (not shown). Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128, which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any measuring while drilling or logging while drilling (MWD/LWD) tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, polycrystalline diamond compact (PDC) bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, any transport vessels, conduits, pipelines, trucks, tubulars, and/or pipes used to fluidically move the fluids from one location to another; any pumps, compressors, or motors used to drive the fluids into motion; any valves or related joints used to regulate the pressure or flow rate of the fluids; and any sensors (i.e., pressure and temperature), gauges, and/or combinations thereof, and the like.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Table 1 list the ingredients and concentrations for 6 different treatment fluids. The treatment fluids contained deionized water as the base fluid; a terpolymer of 2-acrylamido-2-methylpropane sulfonic acid (AMPS®), acrylamide and acrylic acid as the viscosifier; sodium chlorate as the breaker; CAT-3™, a copper (II) ethylenediaminetatraacetic acid chelate complex as the activator; FERCHECK® as the gel stabilizer; BA-2L™ at 12% weight by volume as the cross-linking buffer; CL-40™ as the cross-linking agent; ammonium chloride as the cross-linking agent activator; CLAY FIX II PLUS™ as the clay control; and GAS PERM 1000M™ as the non-emulsifier.

TABLE 1

| Ingredient | Fluid #1 | Fluid #2 | Fluid #3 | Fluid #4 | Fluid #5 | Fluid #6 |
| --- | --- | --- | --- | --- | --- | --- |
| Viscosifier (v/v) | 1.5% | 1.5% | 1.5% | 1.5% | 1.5% | 1.5% |
| Breaker (gal/Mgal) | 10 | 10 | 10 | 10 | 10 | 10 |
| Activator (gal/Mgal) | 0 | 0.05 | 0 | 0.1 | 0.2 | 0.35 |
| Gel Stabilizer (gal/Mgal) | 2.5 | 2.5 | 2.5 | 2.5 | 2.5 | 2.5 |
| Cross-linking Buffer (gal/Mgal) | 2.5 | 2.5 | 2.5 | 2.5 | 2.5 | 2.5 |
| Cross-linking Agent (gal/Mgal) | 0.5 | 0.5 | 0.5 | 0.5 | 0.5 | 0.5 |
| Cross-linking Agent Activator (gal/Mgal) | 2.5 | 2.5 | 2.5 | 2.5 | 2.5 | 2.5 |
| Clay Control (gal/Mgal) | 2 | 2 | 2 | 2 | 2 | 2 |
| Non-emulsifier (gal/Mgal) | 2 | 2 | 2 | 2 | 2 | 2 |

Figure 2:
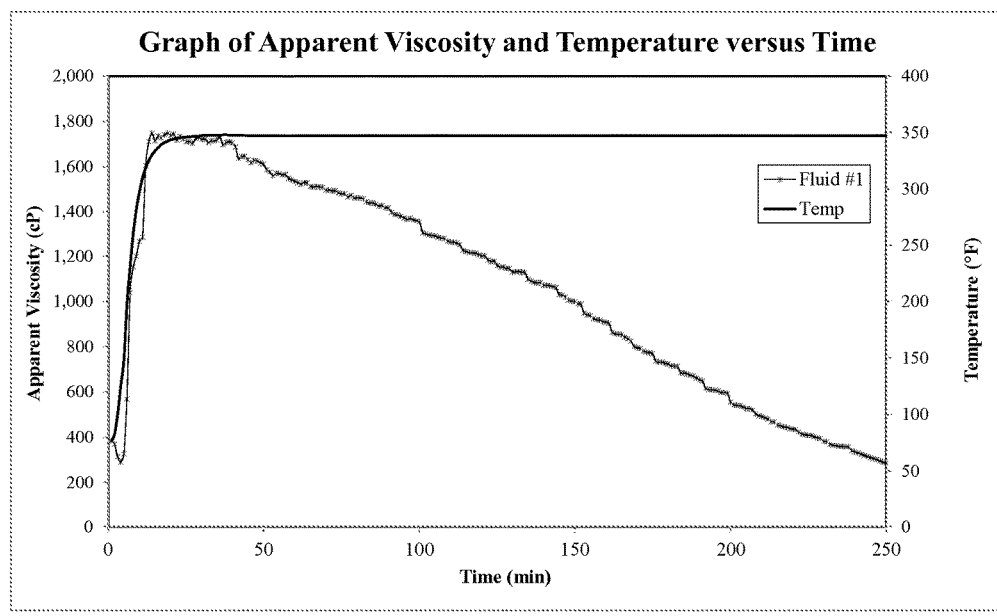
FIG. 2 is a graph of apparent viscosity and temperature versus time for a treatment fluid containing a viscosifier and breaker without an activator when tested at a temperature above the breaker-activation temperature.

FIG. 2 is a graph of apparent viscosity and temperature versus time for Fluid #1 without the activator at a temperature of 350° F. (177° C.), which is a temperature greater than or equal to the breaker-activation temperature. As can be seen, the viscosity of the fluid decreased from approximately 1,700 cP to approximately 50 cP in about 4 hours. This indicates that at temperatures greater than or equal to the breaker-activation temperature, the breaker is activated to break the viscosity of the fluid without an activator being present.

Figure 3:
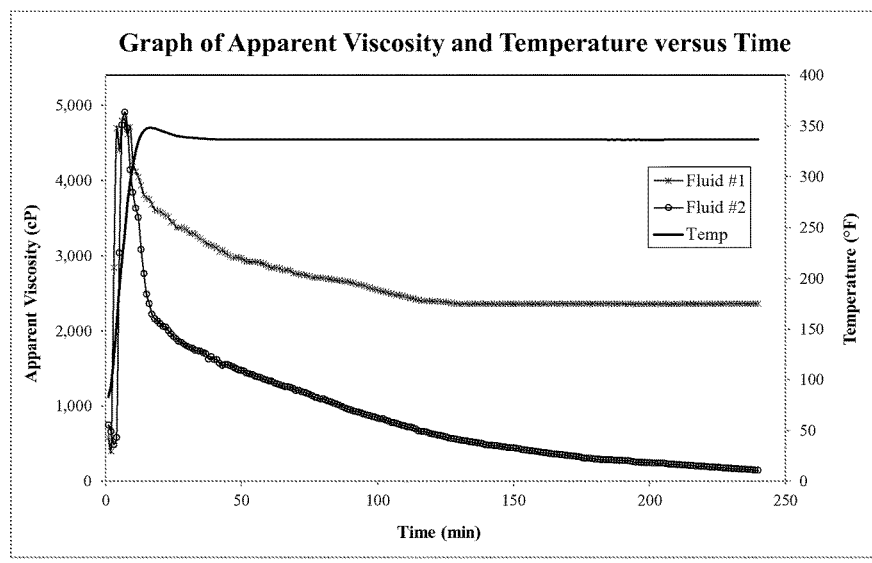
FIG. 3 is a graph of apparent viscosity and temperature versus time for two different treatment fluids containing a viscosifier and breaker with or without an activator when tested at a temperature below the breaker-activation temperature.

FIG. 3 is a graph of apparent viscosity and temperature versus time for Fluids #1 and #2 without and with the activator, respectively, at a temperature of 340° F. (171° C.), which is a temperature less than the breaker-activation temperature. As can be seen, the viscosity of Fluid #1 did not have a significant reduction in viscosity, whereas Fluid #2 with the activator had a substantial decrease in viscosity. This indicates that at temperatures less than the breaker-activation temperature, the breaker is only activated by the presence of the activator to break the viscosity of the fluid.

Figure 4:
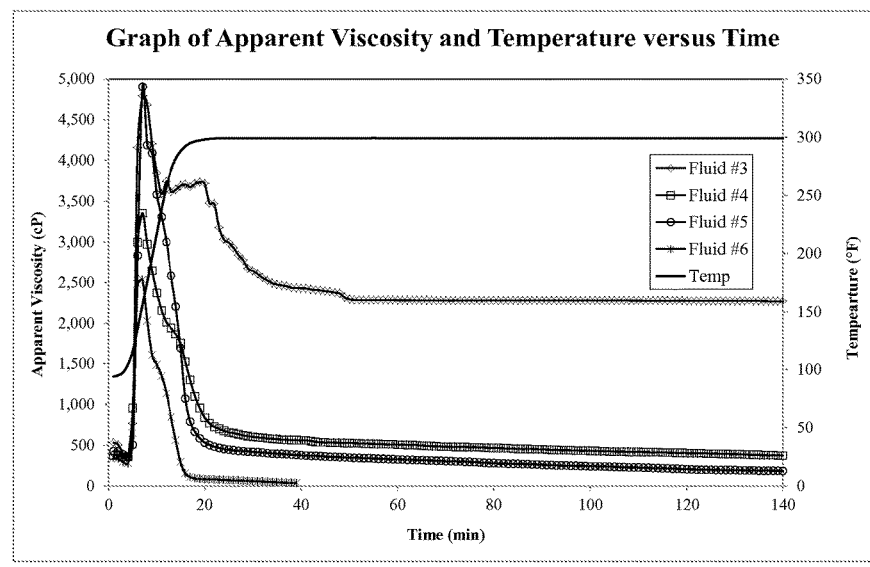
FIG. 4 is a graph of apparent viscosity and temperature versus time for a several treatment fluids containing a viscosifier and breaker with or without an activator when tested at a temperature below the breaker-activation temperature.

FIG. 4 is a graph of apparent viscosity and temperature versus time for Fluids #3-#6 at a temperature of 300° F. (149° C.), which is a temperature less than the breaker-activation temperature. Fluid #3 did not contain the activator and Fluids #4-#6 contained various concentrations of the activator. As can be seen, the viscosity of Fluid #3 did not have a significant reduction in viscosity, whereas Fluids #4-#6 with the activator had a substantial decrease in viscosity. This indicates that at temperatures less than the breaker-activation temperature, the breaker is only activated by the presence of the activator to break the viscosity of the fluid. Moreover, very low concentrations of the activator caused a substantial decrease in viscosity. Additionally, as the concentration of the activator increased, the break time was decreased. This indicates that the concentration of the activator can be adjusted to provide a desired break time.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
   introducing a treatment fluid into the subterranean formation, wherein the treatment fluid has a pH less than 7; and wherein the treatment fluid comprises:
   (A) a base fluid;
   (B) a viscosifier, wherein the viscosifier is a synthetic, cross-linked polymer having a thermal stability greater than 275° F.;
   (C) a breaker, wherein the breaker decreases the viscosity of the treatment fluid at or above a breaker-activation temperature;
   (D) an activator, wherein the activator is a chelate complex, and wherein the activator activates the breaker to reduce the viscosity of the treatment fluid at a temperature less than the breaker-activation temperature; and
   (E) a cross-linking agent used to cross-link the viscosifier.

2. The method according to claim 1, wherein the base fluid comprises water, and wherein the water is selected from the group consisting of fresh water, brackish water, sea water, brine, produced water, and any combination thereof in any proportion.

3. The method according to claim 1, wherein the polymer is formed from monomer residues, and wherein the monomer residues are selected from the group consisting of 2-acrylamido-2-methylpropane sulfonic acid (AMPS®), acrylamide, acrylic acid and salts thereof, N-[tris(hydroxymethyl)methyl]acrylamide, and combinations thereof.

4. The method according to claim 3, wherein the viscosifier is a terpolymer of 2-acrylamido-2-methylpropane sulfonic acid, acrylamide, and acrylic acid.

5. The method according to claim 1, and wherein the cross-linking agent comprises a metal ion selected from the group consisting of titanium (IV); zirconium (IV); hafnium (IV); D-block metals of the periodic table; and combinations thereof.

6. The method according to claim 1, wherein the viscosifier is in a concentration in the range of about 0.1% to about 5% by weight of base fluid.

7. The method according to claim 1, wherein the viscosifier is in a sufficient concentration such that the treatment fluid has an apparent viscosity in the range of about 200 to about 5,000 cP at a temperature of 300° F. and at shear rate 40 1/sec prior to the reduction in viscosity.

8. The method according to claim 1, wherein the breaker is selected from the group consisting of sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, and combinations thereof.

9. The method according to claim 1, wherein the breaker is in a concentration in the range of about 0.1% to about 10% by volume of the base fluid.

10. The method according to claim 1, wherein the activator chelate complex comprises a metal, metal oxide, or metal hydroxide.

11. The method according to claim 10, wherein the metal is selected from the group consisting of copper, zinc, iron, chromium, manganese, nickel, vanadium, cobalt, and combinations thereof.

12. The method according to claim 1, wherein the activator chelate complex comprises a ligand, and wherein the ligand is selected from the group consisting of ethylenediaminetetraacetic acid; iminodiacetic acid; nitrilotriacetic acid; diethylene triamine pentaacetic acid; ethylene glycol tetraacetic acid; 1,2-bis(o-aminophenoxy)ethane-N,N,N',N'-tetraacetic acid; 1,4,7,10-tetraazacyclododecane-1,4,7,10-tetraacetic acid; nicotianamine; any polyamino carboxylic acids; propylenediaminetetraacetic acid; N-(2-hydroxyethyl)ethylenediaminetriacetic acid; hydroxyethyliminodiacetic acid; cyclohexylenediaminetetraacetic acid; diphenylaminesulfonic acid; ethylenediamindi(o-hydroxyphenylacetic) acid; glucoheptonic acid; gluconic acid; citric acid, any salt thereof; glutamic acid diacetic acid; methylglycine diacetic acid; β-alanine diacetic acid; 1 ethylenediaminedisuccinic acid; S,S-ethylenediaminedisuccinic acid; iminodisuccinic acid; hydroxyiminodisuccinic acid; polyamino disuccinic acids; N-bis[2-(1,2-dicarboxyethoxy)ethyl]glycine; N-bis[2-(1,2-dicarboxyethoxy)ethyl] aspartic acid; N-bis[2-(1,2-dicarboxyethoxy)ethyl]methylglycine; N-tris[(1,2-dicarboxyethoxy)ethyl]amine; N-methyliminodiacetic acid; N-(2-acetamido)iminodiacetic acid; hydroxymethyl-iminodiacetic acid, 2-(2-carboxyethylamino) succinic acid; 2-(2-carboxymethylamino) succinic acid; diethylenetriamine-N,N"-disuccinic acid; triethylenetetramine-N,N'"-disuccinic acid; 1,6-hexamethylenediamine-N,N'-disuccinic acid; tetraethylenepentamine-N,N""-disuccinic acid, 2-hydroxypropylene-1,3-diamine-N,N'-disuccinic acid; 1,2-propylenediamine-N,N'-disuccinic acid, 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; and combinations thereof.

13. The method according to claim 1, wherein the activator is copper (II) ethylenediaminetetraacetic acid.

14. The method according to claim 1, wherein the treatment fluid is a drilling fluid, a drill-in fluid, a packer fluid, a completion fluid, a spacer fluid, a work-over fluid, an insulating fluid, or a stimulation fluid.

15. The method according to claim 1, wherein the subterranean formation has a bottomhole temperature that is less than the breaker-activation temperature.

16. The method according to claim 1, wherein the treatment fluid is a fracturing fluid and further comprising creating or enhancing one or more fractures in the subterranean formation during the step of introducing.

17. The method according to claim 1, further comprising causing or allowing the activator to activate the breaker, wherein the activation of the breaker reduces the viscosity of the treatment fluid.

18. The method according to claim 1, wherein the breaker does not reduce the viscosity of the treatment fluid for a desired period of time, and wherein the desired period of time is in the range of about 30 minutes to about 48 hours.

19. The method according to claim 1, wherein the breaker reduces the viscosity of the treatment fluid to less than 500 cP in a time greater than or equal to 150 minutes.

20. The method according to claim 1, wherein the treatment fluid is introduced into the subterranean formation using one or more pumps.

21. A wellbore treatment fluid comprising:
- a base fluid;
- a viscosifier, wherein the viscosifier is a synthetic, cross-linked polymer having a thermal stability greater than 275° F.;
- a breaker, wherein the breaker decreases the viscosity of the treatment fluid at or above a breaker-activation temperature;
- an activator, wherein the activator is a chelate complex, and wherein the activator activates the breaker to reduce the viscosity of the treatment fluid at a temperature less than the breaker-activation temperature;
- a cross-linking agent used to cross-link the viscosifier; and
- wherein the treatment fluid has pH less than 7.

* * * * *